UNITED STATES PATENT OFFICE.

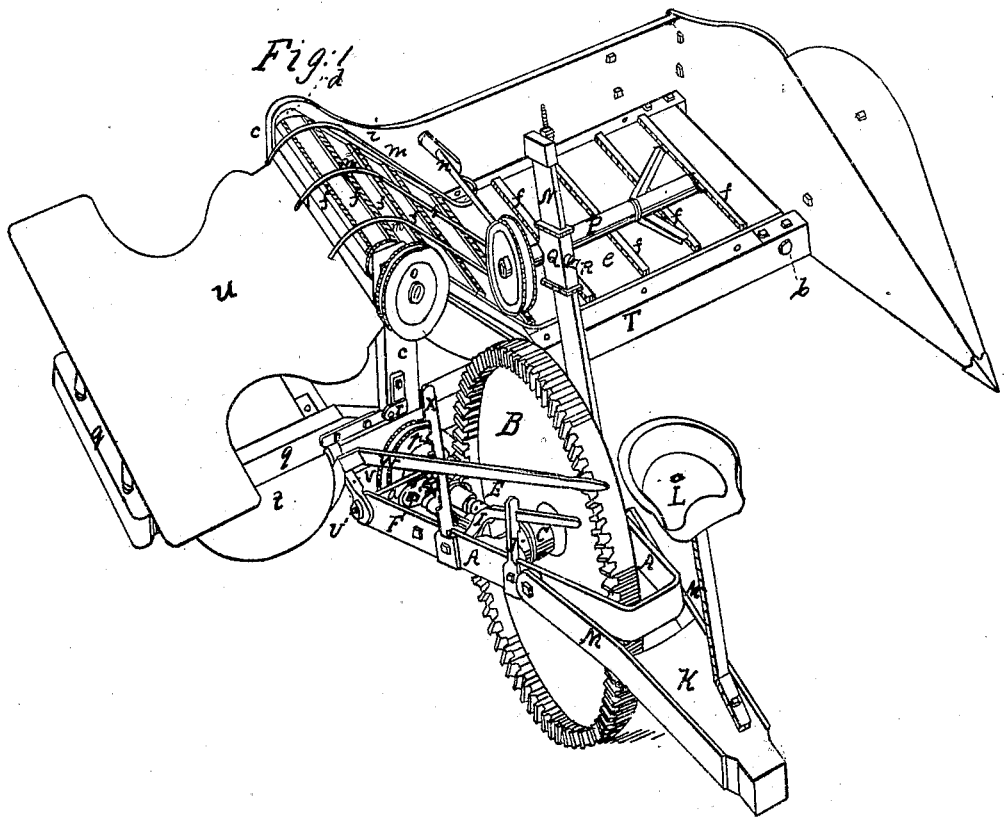

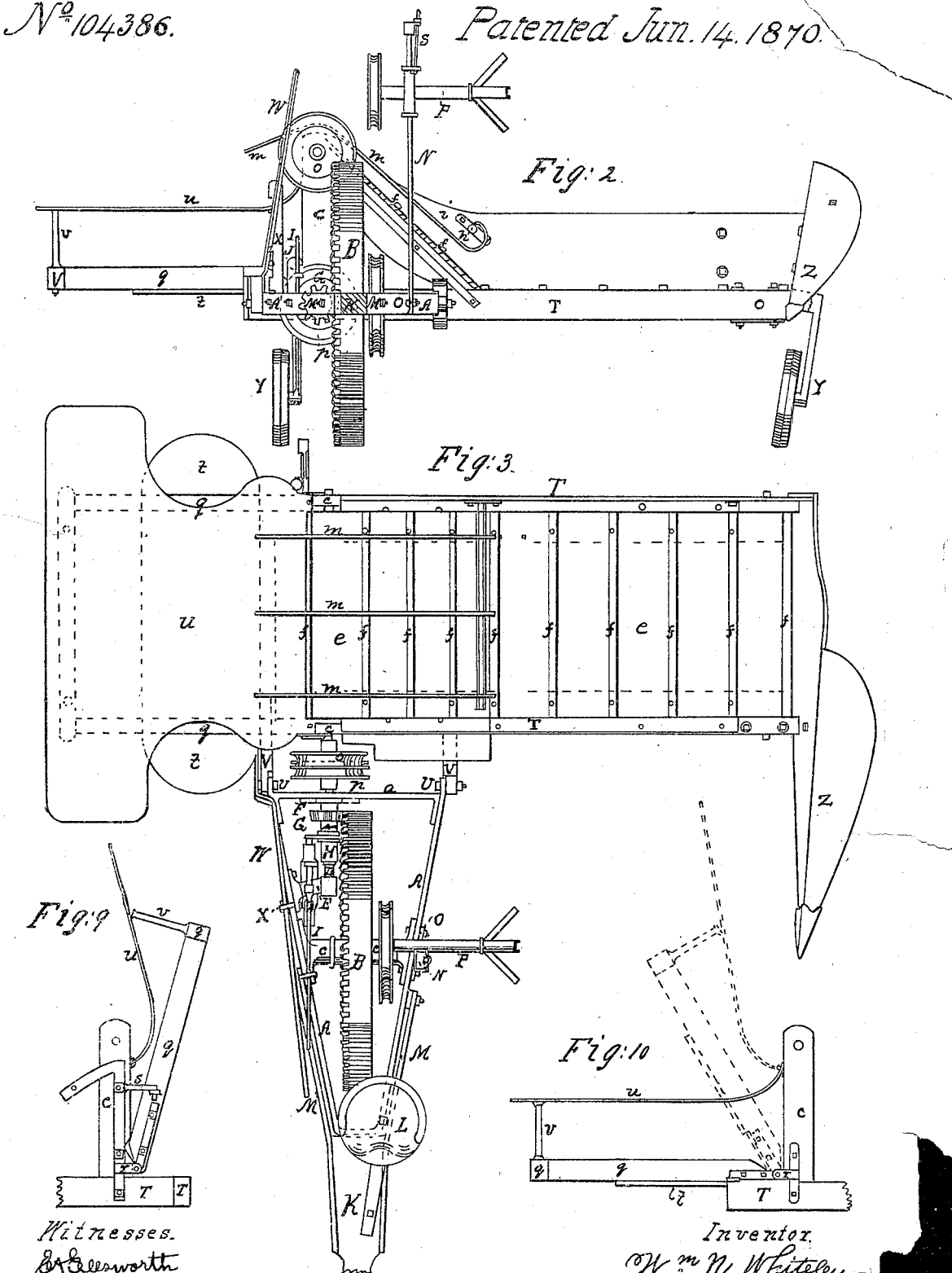

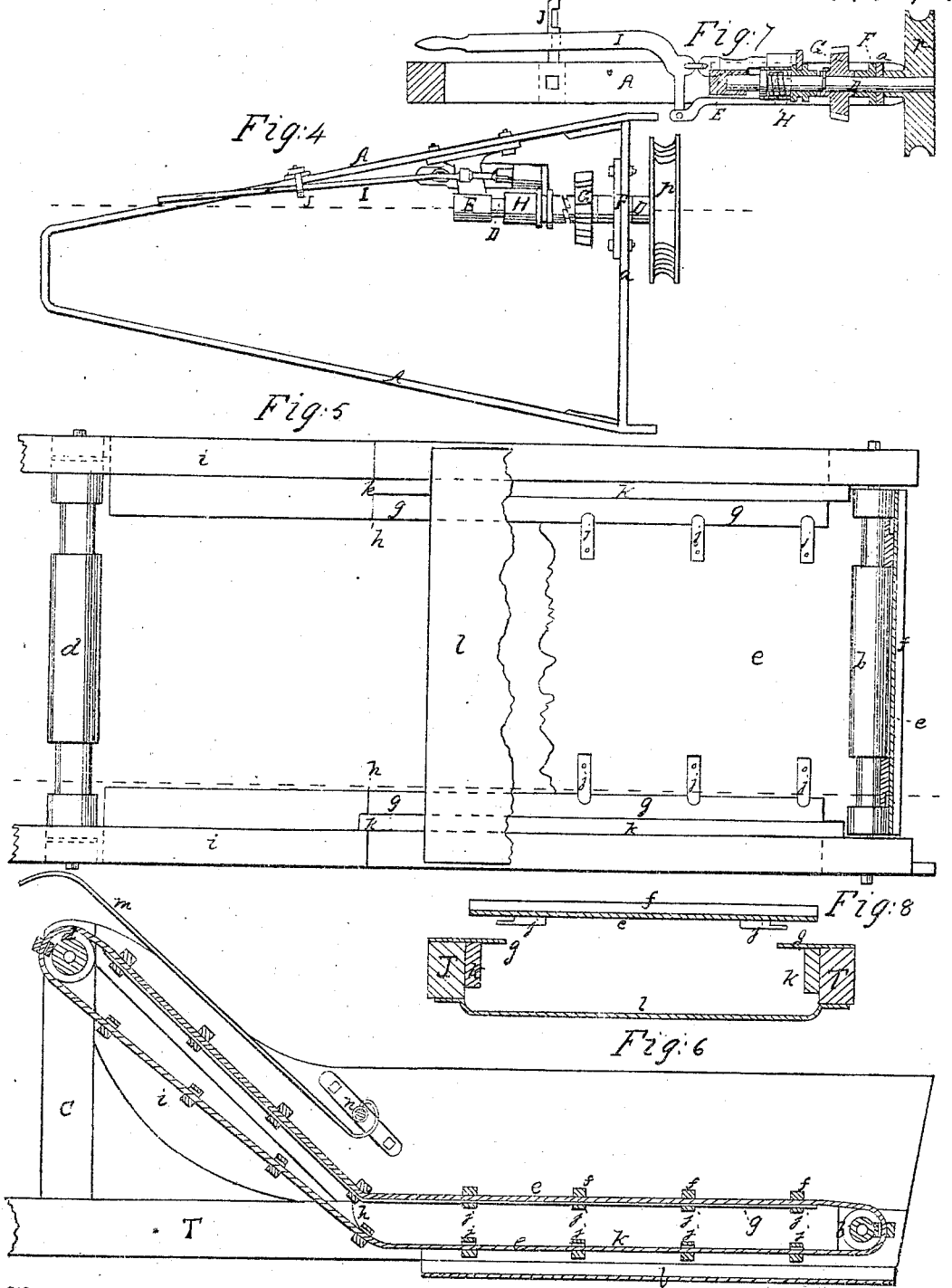

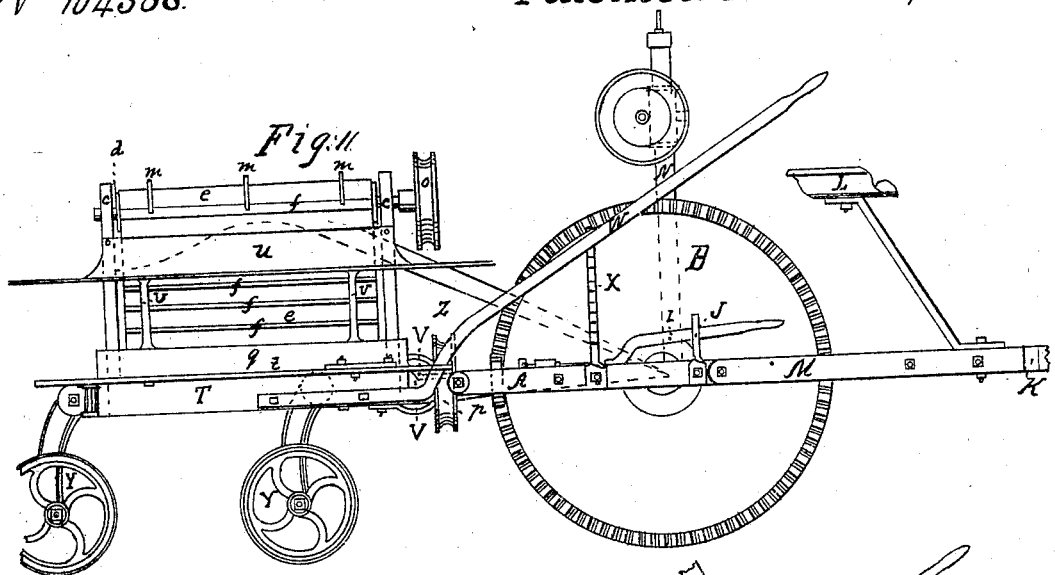
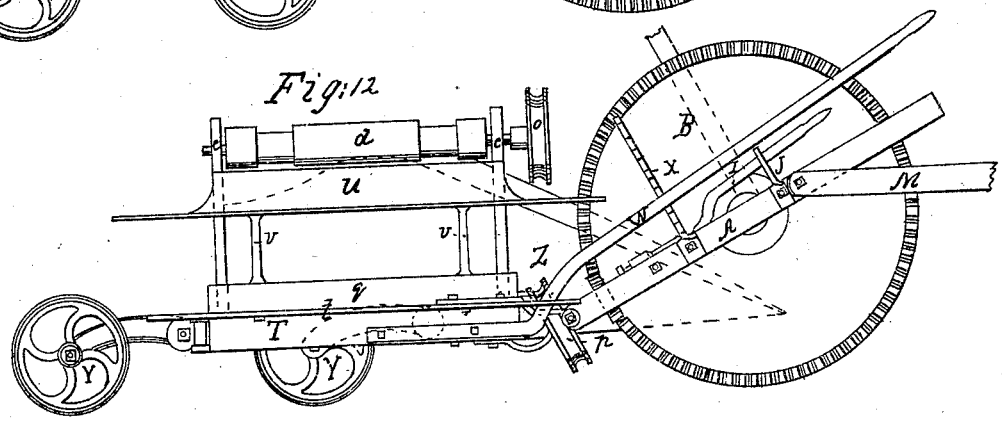
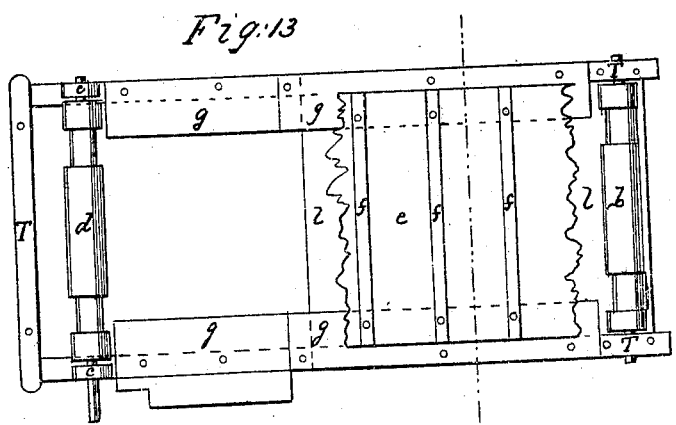
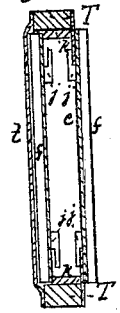

WILLIAM N. WHITELEY, OF SPRINGFIELD, OHIO.

IMPROVEMENT IN HARVESTERS.

Specification forming part of Letters Patent No. 104,386, dated June 14, 1870.

*To all whom it may concern:*

Be it known that I, WILLIAM N. WHITELEY, of Springfield, in the county of Clarke and State of Ohio, have invented a new and useful Improvement in Harvesters; and I do hereby declare the following to be a full, clear, and exact description of the same, reference being had to the accompanying drawing, in which—

Figure 1 is a perspective view of my machine ready for operation; Fig. 2, front elevation of the same; Fig. 3, plan of the same; Fig. 4, plan of main frame; Fig. 5, bottom plan of platform, &c.; Fig. 6, longitudinal section of platform; Fig. 7, longitudinal section through main frame; Fig. 8, transverse section of platform, parts detached; Fig. 9, rear elevation, showing binders' stands and table folded for transportation; Fig. 10, rear elevation, showing binders' stand and table in operative position; Fig. 11, side elevation, showing main frame elevated; Fig. 12, side elevation, showing main frame depressed; Fig. 13, plan of platform, with parts broken away to show construction; Fig. 14, transverse section of platform, parts in position.

This invention relates to that class of harvesting-machines wherein the cut crop is received upon an endless traveling apron, and is thereby conveyed to the side of the machine and deposited upon the ground in a continuous swath, or to the hands of one or more attendants, who ride upon the machine and bind the gavels into sheaves before they reach the ground; and it consists, first, in arranging the foot-boards at the end of the apron-frame and in rear of the main frame and driving-wheel, and so that the binders stand on either side of the grain-receiver, and facing each other; second, hinging the binders' foot-board and the grain receiving and binding table to the end of the apron-frame, and providing a holding device, so that they may be folded up and supported while the machine is being transported from place to place; third, in supporting the curved retainer-rods to a single arm projecting from the rear side of the machine; fourth, in the manner of constructing and arranging the main frame.

That others may fully understand the construction and operation of my invention I will particularly describe it.

The main frame A is made in the form of a frustum of a triangle, the two sides and forward end being composed of a single bar of wrought-iron, and the rear end by a cross-bar, a, the ends of which are firmly secured, by welding or otherwise, to the rear ends of the bar A. The main driving and supporting wheel B is surrounded by the main frame A, and its axle is mounted in boxes C C, which are securely bolted to the side bars of the main frame. The crank-shaft D is mounted in boxes E F, the frame of which is bolted to the side bar of the main frame, and the latter to the rear bar a of the same. Said shaft is driven by the cog-gear upon the side of the main wheel B and the corresponding pinion G, mounted loosely upon said shaft. The clutch-sleeve H is capable of an end motion to move into or out of engagement with the pinion G, but is coupled to the shaft D by a feather, which causes the two always to revolve together. The sleeve H is moved out of or into engagement with the pinion G, by means of the clutch-lever I, which is pivoted to the main frame, and projects forward to a point convenient to the hand of the driver when on his seat, so that the mechanism of the harvester may at any moment be thrown into or out of connection with the driving-wheel. A stop, J, retains the lever I in the desired position. The tongue K, upon which is mounted the driver's seat L, is provided at its rear end with two arms, M M, which extend backward outside of the main frame A, and are pivoted thereto at a point close to the axis of the main wheel B. The reel-post N has a cast-iron step-plate, O, bolted to the outer side of the main frame, nearly, or quite opposite, to the axis of the main wheel, and within said step the lower end of the reel-post is rigidly secured. The reel-shaft is mounted in a long box, P, which is provided with a sleeve, Q, fitted to slide upon the reel-post N, and a set-screw, R, to retain it at the desired point of elevation. It is also provided with an adjusting-screw, S, by means of which a limited movement may be procured without trouble when it becomes necessary to adjust the tension of the belt. The platform-frame T is a rectangular frame, of wood or metal, and bears at its front edge the usual cutting apparatus, which is not shown in the drawing, because it forms no part of the present invention. The frame T is supported at its front by a hinge connection with the main frame. This connection is formed by the bolts U U, which pass through the rear ends of the side bars of the main frame and the forward ends of the lugs V V, which are secured to the frame T. A lever, W, is bolted to the platform-frame, and projects thence forward to a point convenient to the hand of the driver when he is upon his seat, and, by means of said lever, he is enabled to raise or depress the rear end of the main frame and front end of frame T, as is shown in Figs. 11 and 12.

A stop-standard, X, erected upon the main frame, serves to retain the lever W at any desired point. In addition to its connection to the main frame by bolts U, the frame T is supported upon the caster-wheels Y Y, one at the outer end of said frame, and one at its rear inner corner. These wheels are adjustable in such a manner that the platform-frame T may be supported at a greater or lesser distance from the ground, as shown in Figs. 11 and 12. A divider, Z, is placed at the outer end of frame T. The cutters are driven by the crank at the rear end of shaft D. Across the outer end of frame T is the roller $b$, and at the inner end of said frame are two posts, $c\ c$, which support at their tops a roller, $d$, similar to roller $b$, and over these two rollers the endless apron $e$ is passed. This apron is crossed by slats $f$, of wood or metal, at short intervals, said slats being secured to the apron $e$ by rivets or otherwise, as most convenient. Along the upper edge of each of side bars of the frame T are placed ledges $g$, upon which the edges of apron $e$ and slats $f$ rest. These ledges continue upon the side bars of the frame T until they reach a point, $h$, opposite the inner ends of the cutting apparatus, whence they incline upward to the tops of the posts $c\ c$. They are supported by the side boards $i\ i$, from the point $h$ to the tops of posts $c\ c$.

To prevent any lateral movement of the apron $e$, as well as to prevent it from lifting during its movement, the fingers or hooks $j$ are secured to the ends of each slat $f$, beneath the apron, so that they will project under the ledges $g$, as shown in Fig. 14, and thus retain the apron in proper place. The ledges $k$ project inward from the side bars of the frame T, to catch the ends of the slats $f$ as the apron returns below the platform-frame, and prevents contact and friction between the two parts of the apron, which are moving in opposite directions. A guard-plate, $l$, protects the lower part of the frame $e$ from contact with the stubble, or any object which may be upon the ground.

As the stalks of grain are severed by the cutters they fall upon the endless apron $e$, and are carried thereby toward the side of the machine, and are continuously discharged over the roller $d$. It is necessary, however, during its elevation from the level of the platform to the roller $d$, to provide against the displacement of grain by the wind, or other causes, and I therefore arrange an elastic compressor, composed of rods $m\ m$, which are connected to the arm $n$, as shown in Figs. 2 and 6, and said arm is only connected to the machine at its rear end. As the grain upon the apron $e$ begins to ascend it passes under the rods $m$, and is thereby kept upon the apron. The elasticity of these rods will cause them to press lightly upon the grain, and will prevent any clogging or bundling, in case, from any cause, it shall be unusually loose or bunchy in its disposition upon the apron. The arm $n$ is unattached and unsupported at its front end, for the purpose of avoiding any possibility of clogging at the butt-ends of the grain, as will frequently occur where the front edge of the compressor is supported by attachments to the apron-frame.

The belt $e$ receives its motion from the crank-shaft D by means of the pulleys O P, though some other arrangement for communicating the proper motion from the driving-wheel to the apron $e$ may be employed, if desired.

As the grain is delivered over the roller $d$, it may be permitted to fall upon the ground in a continuous swath, or it may be received in a receptacle which shall periodically discharge it in gavels upon the ground, either by automatic means or at the discretion of an attendant. Devices for this purpose are common, and do not require any special description. I prefer, however, to arrange a binder's stand and table so that the gavels may be bound into sheaves by one or more attendants before being thrown upon the ground; and to this end I construct the rectangular frame $q$, which is pivoted to the frame T at the bottom of the posts $c\ c$, as shown at $r$, or in some other convenient way. The frame $q$ then rests upon the inner end of the frame T, and is supported in a horizontal position thereby, while the free end of said frame $q$ may be lifted up, moving upon the hinges $r$, as shown in Figs. 9 and 10, and retained in that position during the passage of the machine from place to place by the hook $s$, or its equivalent, for the purpose. The foot-board $t$ is bolted across the frame $q$, in the direction of the machine's forward motion. The attendants who bind the gavels stand upon the foot-board, and have the receiving and binding table between them. The table $u$ is hinged at one side to the upper ends of the posts $c\ c$, as shown in Figs. 9 and 10, and the hinged edge is curved upward, so that the grain which falls upon its surface shall not be lost over the edge of the table underneath the apron $e$. The curved form also enables the attendant to sweep the grain clean from the table with his hand in removing the gavel to be bound. The portion of the table $u$ which is above the foot-board $t$ is cut away to accommodate the body of the attendant, as shown in Figs. 1 and 3, and its outer edge is lengthened and extended as much as may be necessary or desirable, so that it may afford ample space for the convenient binding of the gavels, or as a repository for the bound sheaves, until a number sufficient for a shock has been accumulated, when they may be discharged at once. The outer edge of the table $u$ is supported by posts $v$, which are erected upon the outer edge of the frame $q$. The table $u$ is not attached to the tops of the posts $v$, but only rests upon them, so that, as the frame $q$ is turned up the table $u$ is also raised up, as shown in Figs. 9 and 10.

By hinging the binders' stand and table to the machine, an important reduction in the width of the machine during transportation or for stowage is effected.

Having described my invention, what I claim as new is—

1. The main frame A, surrounding the main wheel B, in connection with the gearing and bearings attached, constructed, and arranged substantially as shown.

2. A foot-board, $t$, and a receiving and binding table, $u$, hinged to the frame T, as set forth, in combination with a holding device, to sustain said foot-board and table, in the manner described, when raised up or folded for transportation.

3. The foot-board $t$, supported in a horizontal position by the apron-frame T, and provided with the posts $v$, and a receiving and binding table, $u$, arranged to be supported at its outer edge by resting upon the tops of said posts, as and to the effect set forth.

4. The elastic compressor, supported by its connection through the arm $n$ to the rear side of the machine only, substantially as and for the purpose descrided.

WM. N. WHITELEY.

Witnesses:
WILLIAM STILLWELL,
THOMAS J. PRINGLE.